(12) United States Patent
Khoo et al.

(10) Patent No.: US 7,687,077 B2
(45) Date of Patent: Mar. 30, 2010

(54) METHOD TO REDUCE STOOL ODOR OF COMPANION ANIMALS

(75) Inventors: Christina Khoo, Lawrence, KS (US); Dale Scherl, Lawrence, KS (US)

(73) Assignee: Hill's Pet Nutrition, Inc., Topeka, KS (US)

(*) Notice: Subject to any disclaimer, the term of this patent is extended or adjusted under 35 U.S.C. 154(b) by 1140 days.

(21) Appl. No.: 10/996,720

(22) Filed: Nov. 24, 2004

(65) Prior Publication Data

US 2005/0112179 A1 May 26, 2005

Related U.S. Application Data

(60) Provisional application No. 60/525,306, filed on Nov. 26, 2003.

(51) Int. Cl.
 *A01N 59/16* (2006.01)
 *A01N 55/02* (2006.01)
(52) U.S. Cl. .................................. 424/641; 514/494
(58) Field of Classification Search ................ 424/641; 517/494
 See application file for complete search history.

(56) References Cited

U.S. PATENT DOCUMENTS

| | | | |
|---|---|---|---|
| 5,339,771 A | 8/1994 | Axelrod | 119/710 |
| 5,401,502 A | 3/1995 | Wunderlich et al. | 424/195.1 |
| 5,405,836 A | 4/1995 | Richar et al. | 514/23 |
| 5,419,283 A | 5/1995 | Leo | 119/709 |
| 6,528,084 B2 | 3/2003 | Yu et al. | 424/439 |
| 6,643,850 B2 * | 11/2003 | Chasen et al. | 4/213 |
| 2001/0002269 A1 * | 5/2001 | Zhao | 426/112 |

FOREIGN PATENT DOCUMENTS

| JP | 2001372821 | * | 4/2001 |
|---|---|---|---|
| JP | 2003023973 | * | 5/2003 |
| WO | WO 9856263 | | 12/1998 |
| WO | WO 0003606 | | 1/2000 |
| WO | WO 01/17364 | | 3/2001 |
| WO | WO 0117364 | | 3/2001 |
| WO | WO 02051443 | | 7/2002 |
| WO | WO 2004030467 | | 4/2004 |

OTHER PUBLICATIONS

Association of American Feed Control Officials, Inc. (2003) *Official Publication*; pp. 126-140.
Giffard et al. (2001) *Journal of the American Veterinary Medical Association* 218(6), 892-896.
NRC (1989) *Nutrient Requirements of Horses*; 5th Revised Edition, pp. 39-48.
NRC (1994) *Nutrient Requirements of Poultry*; 9th Revised Edition, pp. 19-34.
NRC (1998) *Nutrient Requirements of Swine*; 10th Revised Edition, pp. 110-123.
Suarez et al. (1998) *Gut*.; 43, 100-104.
International Search Report for PCT/US2004/39795.
Written Opinion for PCT/US2004/39795.
Database WPI Section Ch, Week 200363 Derwent Publications Ltd., London, GB; AN 2003-666418 XP002329003 & JP 2003 092998 A (Harumi Sangyo KK) Apr. 2, 2003.
Patent Abstracts of Japan vol. 2003, No. 05, May 12, 2003 & JP 2003 023973 A (IT COM Higashi Nippon KK), Jan. 28, 2003.
Giffard C. J. et al: "Administration of charcoal, *Yucca schidigera* and zinc acetate to reduce malodorous flatulence in dogs" Journal of the American Veterinary Medical Association, vol. 218, No. 6 Mar. 15, 2001, pp. 892-896, XP008047181.
Patent Abstracts of Japan vol. 012, No. 198 (C-502), Jun. 8, 1988 & JP 63 000266 A (Takasago Corp), Jan. 5, 1988.
Patent Abstracts of Japan vol. 005, No. 164 (C-076), Oct. 21, 1981 & JP 56 092745 A (Hirosaki Arata), Jul. 27, 1981.

* cited by examiner

*Primary Examiner*—Mina Haghighatian
*Assistant Examiner*—Abigail Fisher
(74) *Attorney, Agent, or Firm*—Shannon McGarrah

(57) ABSTRACT

A method is provided for reducing stool odor of a companion animal such as a cat or dog. The method comprises causing the animal to ingest a composition comprising a stool odor reducing effective amount of a zinc ion source, for example zinc acetate.

12 Claims, No Drawings

METHOD TO REDUCE STOOL ODOR OF COMPANION ANIMALS

This application claims priority of U.S. provisional patent application Ser. No. 60/525,306, filed Nov. 26, 2003, which is incorporated herein by reference in its entirety.

FIELD OF THE INVENTION

The present invention relates to a method of reducing stool odor in a companion animal.

BACKGROUND OF THE INVENTION

Stool odor in companion animals is an unpleasant reality of living with pets. For owners of animals that live indoors, especially cats and dogs that use litter boxes or are confined to kennels or other small spaces, this problem is particularly unpleasant. Cat litter containing deodorizers has been developed, however this is an imperfect solution to the problem. Stool odor in animals is partially a result of indigestion and microbial fermentation caused by inappropriate bacterial activity, inflammation and poor digestion or motility.

Giffard et al. (2001) *Journal of the American Veterinary Medical Association* 218(6), 892-896 describe the effect of zinc acetate on flatulence in dogs. Zinc acetate reportedly decreased total gas production, number of flatulent episodes and odor of gas.

International Patent Publication No. WO 01/17364 discloses a functional additive for a pet food that includes a combination of *yucca* extract, charcoal and a zinc salt such as zinc acetate and is said to reduce flatulence odor in a pet animal.

Suarez et al. (1998) *Gut* 43, 100-104 describe use of zinc acetate to reduce sulfur gas content from human flatulence.

U.S. Pat. No. 5,405,836 discloses a breath freshening pet biscuit comprising zinc salt topically applied to the biscuit. The zinc reportedly binds volatile sulfur compounds found in the mouth forming a non-volatile entity.

SUMMARY OF THE INVENTION

This invention is directed to methods for reducing stool odor in animals. It is contemplated that such methods can be suitable for use in humans and non-human animals, more particularly, companion animals such as cats and dogs.

The invention is directed, in part, to a method for reducing stool odor in a companion animal, the method comprising causing an animal to ingest a composition comprising a stool odor reducing effective amount of a zinc ion source. The composition can be, for example, a food, supplement, treat, snack or toy.

The composition optionally further comprises one or more odor reducing agents other than a zinc ion source, for example those disclosed hereinbelow. The combination of a zinc ion source and one or more additional odor reducing agents in a composition fed to a companion animal can, according to certain embodiments of the invention, have a superior effect on reducing stool odor.

Advantages and benefits of the present invention will be apparent to one skilled in the art from reading this specification.

DETAILED DESCRIPTION

The term "stool" herein is used generically to refer to feces.

The term "zinc ion source" refers to any zinc compound that provides zinc ions or releases zinc ions upon ingestion by an animal. The zinc ion source should be selected to be in a form acceptable for inclusion in an animal food or for oral administration to an animal in an amount contemplated herein, for example it should not be toxic or otherwise deleterious to animal health. Zinc ion sources include but are not limited to zinc salts, zinc oxide and zinc-polymer complexes.

Zinc salts useful herein include but are not limited to zinc acetate, zinc citrate, zinc gluconate, zinc ascorbate, zinc glycinate, zinc sulfate, and sodium zinc citrate. Where zinc acetate is specifically indicated herein, it will be clear to one skilled in the art that any gastrointestinally acceptable zinc ion source, including zinc salts other than zinc acetate, can be substituted if desired.

It has been found in accordance with this invention that a zinc ion source can be surprisingly effective in reducing stool odor in animals when included in the animal's diet. Without being held to a particular theory, it is believed that zinc ion reduces the level of odor producing compounds including heterocycles, thiols, sulfides, indoles, aldehydes and phenols present in feces, and in this way reduces stool odor.

It is further contemplated in accordance with the present invention that additional odor reducing agent(s), when used in combination with a zinc ion source, can be useful in reducing stool odor in companion animals such as cats and dogs. In various embodiments, such additional odor reducing agent(s) are selected from the group consisting of fibers, minerals, herbs and spices, extracts of herbs and spices, probiotics, enzymes and proteins.

Illustratively, among herbs and spices that can be used together with a zinc ion source are rosemary, garlic, caraway, dove wheat, chickweed, banana, marjoram, chamomile, nutmeg, allspice, cumin, tarragon, thyme, licorice, basil, celery seed, lemon balm, lavender, fennel, anise, nettle, echinacea and *yucca*, for example Mohave *yucca* (*Yucca schidigera*). Extracts of herbs and spices that can be used together with a zinc ion source illustratively include essential oils, for example selected from the group consisting of oils of lemon, peppermint, thyme, vanilla, citrus, cinnamon, eucalyptus, lavender, clove and oregano. Additional plant extracts that can be used according to the invention are listed in U.S. Pat. No. 5,401,502, which is incorporated herein by reference in its entirety.

Without being held to a particular theory, it is believed that odor binding compounds, compounds that mask odors, compounds that reduce odor through microbial modulation, anti-inflammatory means, or enzymatic modulation, and compounds that reduce odor through modification of nitrogen metabolism or binding of ammonia, when used in combination with a zinc ion source, can in some cases have an additive, complementary or synergistic effect on reducing stool odor.

It is contemplated that the methods of this invention can be useful for a variety of animals, including humans and non-human animals such as non-human primates (e.g., monkeys, chimpanzees, etc.), companion animals (e.g., dogs, cats, horses, etc.), farm animals (e.g., goats, sheep, swine, cattle, etc.), laboratory animals (e.g., mice, rats, etc.), birds (e.g., domestic birds such as canaries, parrots, etc. and commercial birds such as chickens, ducks, turkeys, etc.), rodents (e.g., hamsters, guinea pigs, gerbils, rabbits, hedgehogs, ferrets, chinchillas, etc.) and wild, exotic and zoo animals (e.g., wolves, bears, deer, etc.).

In some embodiments of this invention, the animal is a cat.

In other embodiments of this invention, the animal is a dog.

This invention contemplates a variety of compositions containing a zinc ion source, alone or in combination with other odor reducing agents including those listed above. Contemplated compositions include, for example, foods, supplements, treats, snacks, toys (typically chewable and consumable toys), beverages and high-moisture gels. Alternatively, a composition comprising a zinc ion source can be administered in oral unit dosage form such as a pill, tablet, gel, or capsule.

In general, the invention will be found useful for food compositions that comprise, on a dry matter basis, 0 to about 50% by weight of carbohydrate; about 5% to about 70% by weight of protein; about 2% to about 50% by weight fat; and 0 to about 15% by weight of nutritional balancing agents.

A zinc ion source should be present in the composition in an amount effective to reduce stool odor when the composition is used according to the present method. For example, the amount of the zinc ion source, for example zinc acetate or other zinc salt, in a composition of this invention can be an amount providing about 75 to about 3000 ppm zinc ion. One of skill in the art will, by routine testing based on the disclosure herein, readily establish an amount of a particular zinc ion source equivalent in effectiveness to an amount of zinc acetate in the above range.

A "zinc acetate equivalent amount" herein is the amount of a particular zinc ion source that is equivalent in its stool odor reducing effect to a stated amount of zinc ion in the form of zinc acetate.

In one embodiment of the invention, the composition is an animal food comprising a zinc ion source and fiber. Fibers are important food constituents that help modulate gut motility through various mechanisms such as water holding capacity, physical bulking, fuel for the gut bacteria, change in viscosity, etc. Example of fibers include, but are not limited to, cellulose, hemicellulose, citrus pulp, barley, bran, bananas, oat fiber, mannan-oligosaccharide, pectin, xylooligosaccharide, burdock, beet pulp, inulin, arabinogalactan, oligosaccharides from gums, galactose, other xylans, fructans dextrans, resistant starches, etc. The fibers should generally be present at levels of about 0.1% to about 20%, for example about 1% to about 11%, by weight of the composition.

In various embodiments, the composition of the fiber can be 100% non-fermentable fiber, 100% moderately fermentable fiber or 100% highly fermentable fiber.

In other embodiments, the composition of the fiber can include at least about 0.1% by weight, for example at least about 10%, at least about 20%, or at least about 60%, of the total fiber composition in the form of non-fermentable fiber. In certain embodiments, the fiber comprises about 10% to about 80%, for example about 40% to about 60%, by weight of the total fiber composition in the form of fermentable fiber, with the balance being non-fermentable fiber.

In certain embodiments, the composition of the fiber includes about 5% to about 50%, for example about 10% to about 15%, by weight of the total fiber composition of moderately fermentable fiber.

In certain embodiments, the composition of the fiber includes 0% to about 20%, for example about 10% to about 15%, by weight of the total fiber composition in the form of highly fermentable fiber.

Non-fermentable fibers include but are not limited to cellulose, oat fiber, hemicellulose and peanut hulls.

Moderately fermentable fibers include but are not limited to beet pulp, citrus pulp, resistant starches, some gums, galactooligosaccharides, mannan-oligosaccharide, burdock, rice bran, soy fiber, oat glucans, etc.

Highly fermentable fibers include but are not limited to gums, pectins and certain oligosaccharides such as xylooligosaccharides. Gums can include gums produced by microorganisms including but not limited to gellan and xanthan gums, and gums produced by plants such as acacia (gum arabic).

The fiber composition should have an organic matter disappearance or fermentability of about 0% to about 80%, although individual fiber components or fibers used individually can have fermentability ranging from 0% to 100%. "Organic matter disappearance" is the percentage of the organic matter that is lost by fermentation when a fiber composition is incubated in vitro with fecal matter from an animal or human for 12-24 hours at or close to physiological body temperature, and is calculated as:

$$\{1-[(\text{organic matter residue}-\text{organic matter blank})/\text{initial organic matter}]\}\times 100.$$

Typically, the zinc ion source and other, optional, odor reducing agent(s) of the composition are present at concentrations that do not impart an aroma or flavor that causes the animal to perceive the composition to be unacceptable for consumption, or otherwise refuse, reject or be inhibited from ingesting the composition. However, even where such concentrations are exceeded, a desirable aroma and flavor can often be achieved using aroma or flavor enhancers, for example to mask the aroma or flavor of the zinc ion source.

The zinc ion source and other, optional, odor reducing agent(s) of the composition should be present at concentrations that are not deleterious to the animal's health. Thus, for example, zinc acetate should be present at a concentration that does not cause undesirable effects on digestion, particularly long term effects lasting several days or longer. Undesirable effects on digestion can include, for example, constipation or diarrhea.

In one embodiment, the composition is a food supplement comprising a zinc ion source, alone or in combination with one or more additional odor reducing agents. Supplements include, for example, a feed or pet food used with another feed or pet food to improve the nutritive balance or performance of the total. Contemplated supplements include compositions that are fed undiluted as a supplement to other feeds or pet foods, offered free choice with other parts of an animal's ration that are separately available, or diluted and mixed with an animal's regular feed or pet food to produce a complete feed or pet food. The AAFCO, for example, provides a discussion relating to supplements in the American Feed Control Officials, Inc. Official Publication, p. 220 (2003). Supplements can be in various forms including, for example, powders, liquids, syrups, pills, encapsulated compositions, etc.

In another embodiment, the composition is a treat comprising a zinc ion source, alone or in combination with one or more additional odor reducing agents. Treats include, for example, compositions that are given to an animal to entice the animal to eat during a non-meal time. Contemplated treats for canines include, for example, dog biscuits in the shape of dog bones. Treats can be nutritional, wherein the composition comprises one or more nutrients, and can, for example, have a composition as described above for food. Non-nutritional treats encompass any other treats that are non-toxic. The zinc ion source, for example, can be coated onto the treat, incorporated into the treat, or both.

In another embodiment, the composition is a toy comprising a zinc ion source, alone or in combination with one or more additional odor reducing agents. Toys include, for example, chewable toys. Contemplated toys for dogs include, for example, artificial bones. The zinc ion source can be present in a coating on the surface of the toy or on the surface of a component of the toy, or can be incorporated partially or fully throughout the toy, or both. In a contemplated embodiment, the zinc ion source is orally accessible by the intended user.

Illustrative toys suitable for modification in accordance with the invention are disclosed in the patents individually cited below and incorporated herein by reference.

U.S. Pat. No. 5,339,771 and references disclosed therein.

U.S. Pat. No. 5,419,283 and references disclosed therein.

It should be recognized that this invention contemplates both partially consumable toys (e.g., toys comprising plastic components) and fully consumable toys (e.g., rawhides and various artificial bones). It should be further recognized that this invention contemplates toys for both human and non-human use, particularly for companion, farm, and zoo animal use, and particularly for dog or cat use.

The terms "treat" and "toy" can be considered interchangeable for the purposes of this specification. However, in general a treat is fully edible and a toy in accordance with the invention has an edible coating.

In another embodiment, the composition is an aqueous pet beverage. The zinc ion source is present in such a beverage typically in dissolved form. The beverage comprises mainly water and optionally further comprises a flavor enhancing agent such as a liver digest.

In another embodiment, the composition is a high-moisture gel or "solid water" composition, for example substantially as disclosed in U.S. Pat. No. 6,528,084 but with addition of a zinc ion source, typically in dissolved form. Such a composition can have a jelly-like consistency similar to that of Jell-O® dessert.

In preparing a composition of the present invention, the components of the composition are adjusted so that the zinc ion source, alone or in combination with one or more additional odor reducing agents, is present in the composition at a desired concentration, typically in an amount providing about 75 ppm to about 3000 ppm of zinc ion. The zinc ion source can, for example, be incorporated into the composition during formulation processing, such as during and/or after mixing of other components of the composition. Distribution of these components into the composition can be accomplished by any conventional method including standard mixing procedures.

Compositions of the present invention (particularly foods) can be prepared in a canned or wet form using conventional pet food processes. Typical requirements for a nutritionally adequate food composition are:

carbohydrate, 0 to about 90%, illustratively about 5% to about 45%, by weight;

protein, about 5% to about 70%, illustratively about 10% to about 60%, by weight;

fat, about 2% to about 50%, illustratively about 5% to about 40%, by weight;

total dietary fiber, about 0.1% to about 20%, illustratively about 1% to about 11%, by weight; and nutritional balancing agents such as vitamins and minerals, 0 to about 15%, illustratively about 2% to about 8%, by weight.

To these ingredients are added one or more stool odor reducing agents such as zinc acetate, in accordance with the invention.

Vitamins and minerals should be included in amounts required to avoid deficiency and maintain health. The National Research Council, for example, gives recommendations for farm animals in Nutrient Requirements of Swine, 10th Revised Edition (1998); Nutrient Requirements of Poultry, 9th Revised Edition (1994); Nutrient Requirements of Horses, 5th Revised Edition (1989), etc. as published by National Academy Press, Washington, DC. AAFCO provides recommendations for dogs and cats in the American Feed Control Officials, Inc. Official Publication (2003), at pp. 126-240.

In one contemplated embodiment, ground animal (e.g., mammal, poultry, and/or fish) proteinaceous tissues are mixed with other ingredients, including for example animal fats and vegetable oils, cereal grains, other nutritionally balancing ingredients, special purpose additives (e.g., vitamin and mineral mixtures, inorganic salts, cellulose and beet pulp, bulking agents, and the like); and water sufficient for processing is also added. These ingredients typically are mixed in a vessel suitable for heating while blending the components. Heating of the mixture can be effected in any suitable manner, such as, for example, by direct steam injection or by using a vessel fitted with a heat exchanger. Following addition of the last ingredient, the mixture is heated to a temperature of about 10° C. to about 100° C. Temperatures outside this range are acceptable, but can be commercially impractical without use of other processing aids. When heated to the appropriate temperature, the material is typically in the form of a thick liquid. The thick liquid is filled into suitable containers such as cans, jars, pouches or the like. A lid is applied, and the container is hermetically sealed. The sealed containers are then placed into conventional equipment designed to sterilize the contents. This is usually accomplished by heating to a temperature of at least about 110° C. for an appropriate time, which is dependent on, for example, the temperature used and the composition. Products can also be prepared by an aseptic process wherein the contents are heated to commercial sterility before being packaged in sterilized containers.

Compositions of the present invention (particularly foods) can be prepared in a dry form using conventional processes. In one contemplated embodiment, dry ingredients, including, for example, animal protein sources, plant protein sources, grains, etc., are ground and mixed together. Moist or liquid ingredients, including fats, oils, animal protein sources, water, etc., are then added to and mixed with the dry mix. The mixture is then processed into kibbles or similar dry pieces. Kibble is often formed using an extrusion process in which the mixture of dry and wet ingredients is subjected to mechanical work at a high pressure and temperature, and forced through small openings and cut off into kibble by a rotating knife. The wet kibble is then dried and optionally coated with one or more topical coatings which can include, for example, flavors, fats, oils, powders, and the like. Kibble also can be made from the dough using a baking process, rather than extrusion, wherein the dough is placed into a mold before dry-heat processing. Kibble also can be made from a food matrix undergoing pelletization. It is important to note that the zinc ion source, alone or in combination with additional odor reducing agents, can be incorporated into the food composition for example by adding the zinc ion source to the mixture before extrusion or by coating the extruded kibble or pellets with the zinc ion source as an ingredient of a topical coating.

Treats of the present invention can be prepared by, for example, an extrusion or baking process similar to those described above for dry food. Other processes also can be used to either apply a coating comprising a zinc ion source, alone or in combination with one or more additional odor reducing agents, on the exterior of existing treat forms, or to inject the zinc ion source into an existing treat form.

Animal toys of the present invention are typically prepared by coating an existing toy with a composition comprising a zinc ion source, alone or in combination with one or more additional odor reducing agents.

EXAMPLES

The following examples are merely illustrative, and do not limit this disclosure in any way.

Example 1

An experiment was conducted to characterize the effects of zinc acetate on stool odor compounds in dogs. To a control food, which was a dry food composed of kibbles containing a base level of 150 ppm zinc in the form of zinc acetate, various amounts of zinc in the form of zinc acetate were added as a coating on the kibbles. This was done by hand coating (sprinkling) fine zinc acetate powder on the kibble in a rotating drum in a two-step coating process after all other topical ingredients had been added by in-line enrobing. Ten dogs were fed control food with no added zinc, ten dogs were fed control food with 400 ppm zinc added, ten dogs were fed control food with 600 ppm zinc added, and ten dogs were fed control food with 900 ppm zinc added. The dogs were fed one of these diets for three weeks. At the end of three weeks, stool samples were collected and analyzed by putting a standard amount of stool in a glass container and incubating a solid phase microextraction fiber in the headspace. Volatiles bound to the fiber were eluted onto a gas chromatograph for analysis. The compounds were identified using a flame ionization chamber.

The results are shown in Table 1 below. The numbers indicate relative differences as measured by the area under the peak in a chromatogram. The addition of zinc to the food resulted in decreased levels of phenols, thiols and sulfides and indoles. In some instances, low amounts of zinc were able to decrease the level of the stool odor compounds, for example, indoles. In other instances, increasing levels of zinc resulted in decreasing levels of the particular odor compound, for example, phenols and thiols.

TABLE 1

Effect of added zinc acetate on stool odor compounds

|  | Control food | 400 ppm added zinc | 600 ppm added zinc | 900 ppm added zinc |
|---|---|---|---|---|
| Carboxylic acids ($\times 10^4$) | 5.06 ± 5.33 | 3.79 ± 3.55 | 22.7 ± 32.2 | 27.2 ± 21.2 |
| Esters ($\times 10^5$) | 39.8 ± 42.7 | 34.3 ± 34.0 | 34.1 ± 34.4 | 32.6 ± 0.9 |
| Heterocycles ($\times 10^4$) | 1.08 ± 5.97 | 0.94 ± 0.37 | 1.19 ± 0.54 | 1.13 ± 0.49 |
| Phenols ($\times 10^4$) | 13.6 ± 8.10 | 9.62 ± 6.0 | 9.17 ± 5.64 | 4.08 ± 3.58 |
| Thiols/Sulfides ($\times 10^4$) | 6.16 ± 6.39 | 8.69 ± 6.16 | 5.14 ± 2.4 | 4.91 ± 1.3 |
| Ketones ($\times 10^6$) | 256 ± 124 | 179 ± 0.89 | 201 ± 66.5 | 160 ± 63.1 |
| Aldehydes ($\times 10^3$) | 0.53 ± 0.39 | 0.45 ± 0.3 | 0.56 ± 0.51 | 1.09 ± 1.29 |
| Alcohols ($\times 10^5$) | 10.0 ± 7.55 | 17.3 ± 12.5 | 12.3 ± 0.9 | 23.4 ± 14.3 |
| Indoles ($\times 10^4$) | 3.88 ± 2.36 | 2.64 ± 2.19 | 2.0 ± 0.86 | 1.78 ± 2.45 |

Example 2

An experiment was conducted to characterize the effects of zinc acetate on stool odor compounds in cats. To a control food, which was a dry food composed of kibbles containing a base level of 160 ppm zinc in the form of zinc acetate, various amounts of zinc were added in the form of zinc acetate as in Example 1. Eight cats were fed control food with no added zinc, eight cats were fed control food with 860 ppm zinc acetate added, seven cats were fed control food with 1200 ppm zinc acetate added, and seven cats were fed control food with 1800 ppm zinc acetate added. The cats were fed one of these diets for one month. At the end of the month, stool samples were collected and analyzed as described in Example 1.

The results are shown in Table 2 below. The numbers indicate relative differences as measured by the area under the peak in a chromatogram. The addition of zinc to the food resulted in decreased stool levels of heterocycles, indoles, aldehydes and phenols. In some cases, a minimum level of zinc was able to decrease stool odor compounds, particularly indoles and heterocycles. In other cases, higher levels of zinc resulted in a larger decrease, for example in the case of phenol.

TABLE 2

Effect of added zinc acetate on stool odor compounds

|  | Control food | 860 ppm added zinc | 1200 ppm added zinc | 1800 ppm added zinc |
|---|---|---|---|---|
| Carboxylic acids ($\times 10^4$) | 146 ± 114 | 317 ± 160 | 225 ± 78.1 | 146 ± 144 |
| Esters ($\times 10^4$) | 59.6 ± 38.8 | 78.4 ± 22.9 | 76.9 ± 47.5 | 28.7 ± 1.8 |
| Heterocycles ($\times 10^4$) | 0.79 ± 0.13 | 0.62 ± 0.13 | 0.62 ± 0.22 | 0.46 ± 0.17 |
| Phenols ($\times 10^4$) | 11.8 ± 9.1 | 10.3 ± 4.3 | 12.6 ± 4.7 | 7.2 ± 2.7 |
| Thiols/Sulfides ($\times 10^4$) | 4.47 ± 3.3 | 6.2 ± 2.3 | 7.7 ± 3.4 | 6.8 ± 3.9 |
| Ketones ($\times 10^4$) | 93.9 ± 72.5 | 25.6 ± 8.14 | 60.7 ± 38.1 | 42.2 ± 26.2 |
| Aldehydes ($\times 10^4$) | 3.2 ± 1.9 | 5.6 ± 3.6 | 3.6 ± 1.7 | 1.9 ± 1.6 |
| Alcohols ($\times 10^4$) | 5.6 ± 7.1 | 13.2 ± 27 | 6.87 ± 10.8 | 15.1 ± 23.3 |
| Indoles ($\times 10^4$) | 3.5 ± 5.7 | 0.39 ± 0.3 | 0.88 ± 0.62 | 2.3 ± 1.5 |

All patents and publications cited herein are incorporated by reference into this application in their entirety.

The words "comprise", "comprises", and "comprising" are to be interpreted inclusively rather than exclusively.

What is claimed is:

1. A method for reducing stool odor of a companion animal in need thereof, the method comprising causing the animal to ingest a pet food composition consisting of:
   (i) a stool odor reducing effective amount of a zinc ion source;
   (ii) about 5% to about 45% by weight carbohydrate based on the weight of the composition;
   (iii) about 10% to about 60% by weight protein based on the weight of the composition;
   (iv) about 5% to about 40% by weight fat based on the weight of the composition;
   (v) about 0.1% to about 20% total dietary fiber based on the weight of the composition; and
   (vi) 0 to about 15% nutritional balancing agents based on the weight of the composition.

2. The method of claim 1, wherein the zinc ion source is present in the composition in an amount providing about 75 ppm zinc ion and not sufficient to cause an adverse effect on digestion of the animal.

3. The method of claim 1, wherein the zinc ion source is present in the composition in an amount providing about 75 ppm to about 3000 ppm zinc ion.

4. The method of claim 1, wherein the zinc ion source is a zinc salt.

5. The method of claim 4, wherein the zinc salt is selected from the group consisting of zinc acetate, zinc citrate, zinc gluconate, zinc ascorbate, zinc glycinate, zinc sulfate, and sodium zinc citrate.

6. The method of claim 4, wherein the zinc salt is zinc acetate.

7. The method of claim 6, wherein the zinc acetate is present in the composition in an amount providing about 200 ppm zinc ion.

8. The method of claim 6, wherein the zinc acetate is present in the composition in an amount providing about 500 ppm zinc ion.

9. The method of claim 1, wherein the animal is a cat.

10. The method of claim 1, wherein the animal is a dog.

11. The method of claim 1, wherein the composition is in the form of a toy coating.

12. The method of claim 1, wherein the composition is in the form of a pill, a tablet, a gel or a capsule.

* * * * *